United States Patent [19]

Hildebrandt et al.

[11] Patent Number: 4,894,571

[45] Date of Patent: Jan. 16, 1990

[54] APPARATUS FOR MAKING ELECTRICAL CONNECTIONS IN A DYNAMOELECTRIC MACHINE

[75] Inventors: Eugene F. Hildebrandt; Thomas V. Ottersbach, both of St. Louis, Mo.

[73] Assignee: Emerson Electric Co., St. Louis, Mo.

[21] Appl. No.: 255,727

[22] Filed: Oct. 7, 1988

[51] Int. Cl.⁴ .................................... H02K 11/00
[52] U.S. Cl. ............................ 310/68 C; 310/71; 361/24
[58] Field of Search .............. 310/68 C, 71, 68 R, 310/68 B; 361/23-25

[56] References Cited

U.S. PATENT DOCUMENTS

| 4,585,964 | 4/1986 | Hildebrandt | 310/68 C |
| 4,649,304 | 3/1987 | Atherton et al. | 310/68 C |
| 4,656,378 | 4/1987 | Atherton et al. | 310/68 C |

Primary Examiner—Patrick R. Salce
Assistant Examiner—Judson H. Jones
Attorney, Agent, or Firm—Polster, Polster and Lucchesi

[57] ABSTRACT

A dynamoelectric machine includes a stator assembly having one or more sets of electrical windings. Apparatus for electrically interconnecting external electrical leads, a thermal protector and ends of each set of windings includes a protector block for commonly connecting one end of at least one winding set with the thermal protector. The thermal protector is housed in the protector block. A terminal block interlocks with the protector block to hold the thermal protector in place. An electrically conductive arm of the thermal protector extends through the terminal block to effect connection of the thermal protector with an external lead. The terminal block also provides for connection of the other end of each winding set with another external lead.

28 Claims, 4 Drawing Sheets

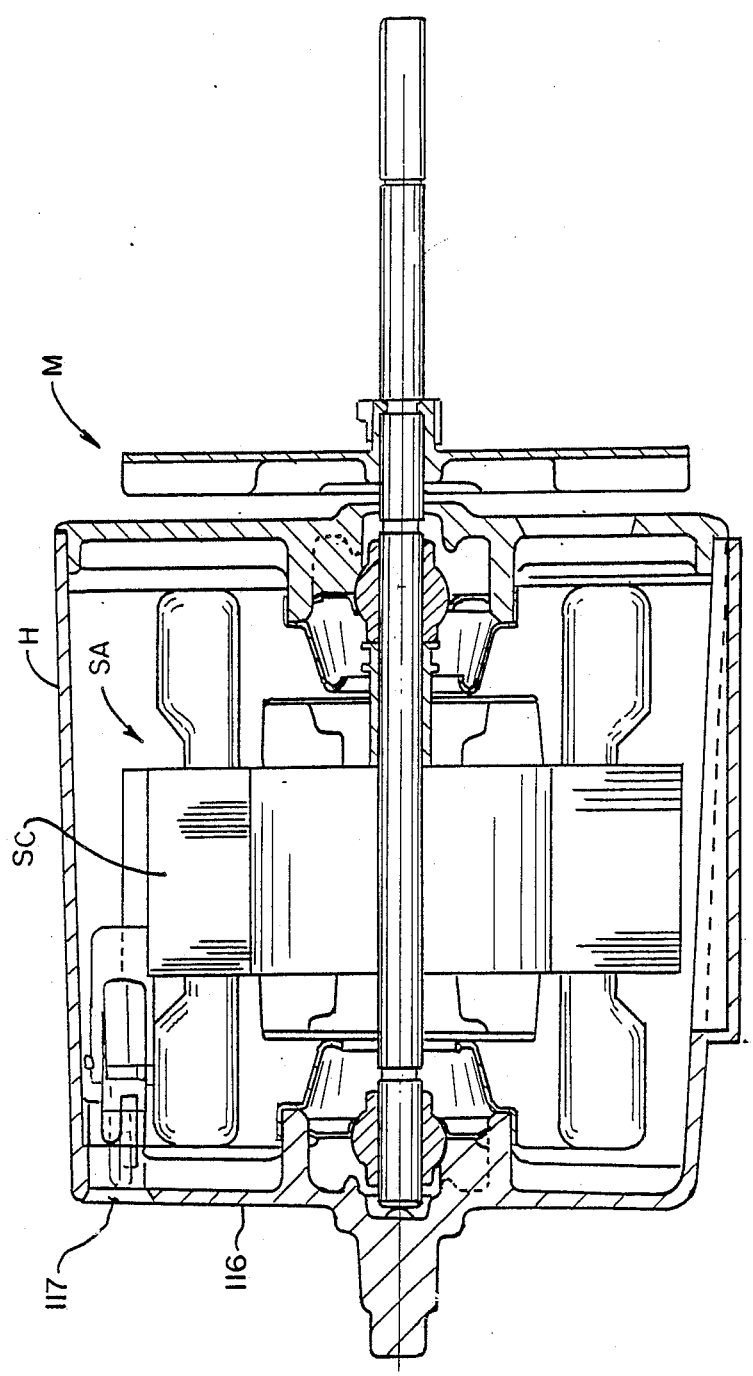
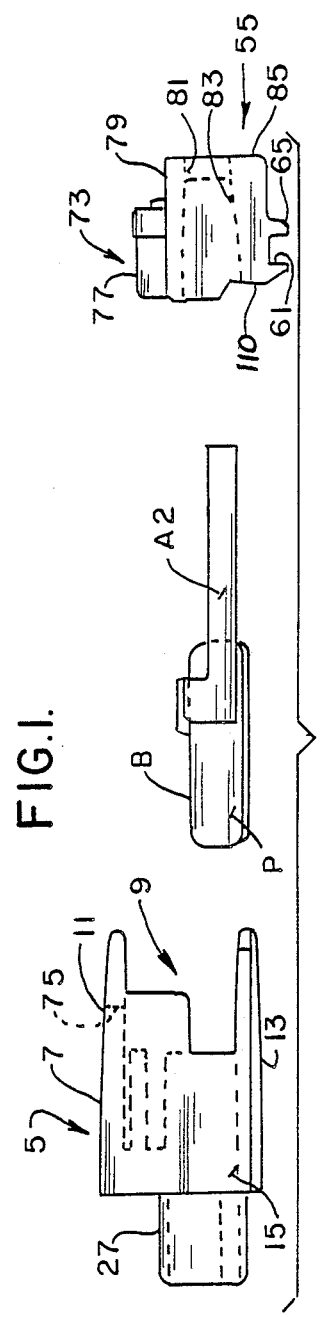
FIG.1.
FIG.5.

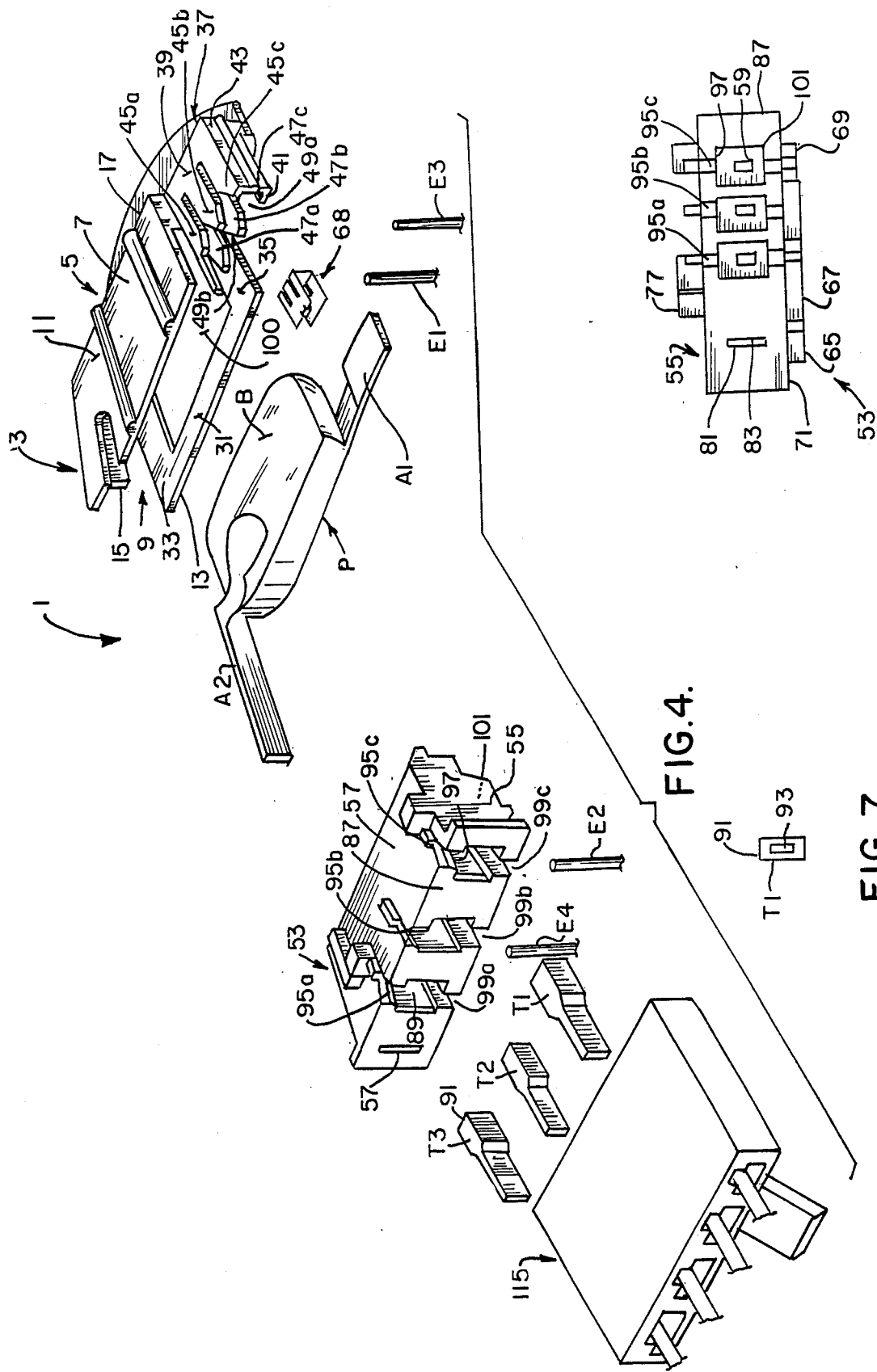

APPARATUS FOR MAKING ELECTRICAL CONNECTIONS IN A DYNAMOELECTRIC MACHINE

BACKGROUND OF THE INVENTION

Dynamoelectric machines such as electric motors are commonly used in household appliances such as, for example, dishwashers. During the manufacture of such motors it is necessary to interconnect sets of electrical windings of a motor stator assembly with external electrical leads by which current is supplied to the motor. Also, a thermal protector, functioning as a circuit breaker, is installed in the electrical circuit formed with the stator windings to open the winding circuit if the sensed winding temperature exceeds a predetermined value. This is done to protect the stator windings from over heating and prolong the life of the motor.

Because of space limitations within the motor housing, it is desirable, if possible, to provide for the interconnection of these various components in as small a space as possible. At the same time, it is also desirable, from a manufacturing efficiency standpoint, to make the electrical interconnections between these components an automated procedure. It is further desirable to make such interconnections without requiring soldering of the various leads, as well as to provide a termination assembly which is amenable to automatic testing of the final motor assembly.

SUMMARY OF THE INVENTION

Among the several objects of the present invention may be noted the provision of apparatus for electrically interconnecting electrical components installed in a dynamoelectric machine such as an electric motor; the provision of such apparatus for interconnecting the ends of sets of electrical windings of a stator assembly with a thermal protector, and to facilitate connection of these components with external electrical leads by which current is supplied to the motor; the provision of such apparatus to permit auotmated installation and interconnection of the various electrical components; the provision of such apparatus to provide for automatic termination of the various components without the need, for example, of soldering, welding or mechanical crimp; the provision of such apparatus to permit the final assembly to be automatically tested as part of a motor quality control procedure; the provision of such apparatus to be small in size so to conserve space within the motor housing; the provision of a structure providing easy and reliable mounting to a stator assembly of a motor; and, the provision of such apparatus to maintain the various interconnections during movement and use of the motor so to provide for reliable motor operation.

In accordance with this invention, generally stated, a dynamoelectric machine such as an electric motor has a stator assembly including one or more sets of electrical windings, each end of each set of windings being adapted for connection either directly or through other winding sets to external electrical leads by which an electric current is applied to the windings. A plurality of electrical terminals are used for making the connection between the external leads and the sets of windings. A thermal/current protector is connected between the external leads and the sets of windings for sensing the operating temperature of the stator assembly, and the windings in particular, and interrupting the flow of current to the sets of windings when the sensed temperature and/or current exceeds a predetermined level. An improvement includes apparatus for electrically interconnecting the external electrical leads, the motor protector, and the end of at least one set of windings. In the embodiment illustrated, each winding set is electrically connected to the motor protector. The apparatus includes a first means for commonly connecting one end of at least one winding set with the motor protector and for housing the motor protector. A second means interlocks with the first means to hold the motor protector in place. The second means includes means for effecting connection of the motor protector to one of the external leads and for connecting the other end of the winding set to another of the external leads. An improved construction is provided for mounting a structure to the stator core of a dynamoelectric machine. Other objects and features will be in part apparent and in part pointed out hereinafter.

BRIEF DESCRIPTION OF THE DRAWINGS

In the drawings, FIG. 1 is a cross sectional view of a dynamoelectric machine such as an electric motor illustrating the installation of the apparatus of the present invention;

FIG. 4 is exploded view of the various components comprising the apparatus of the present invention;

FIG. 5 is a side elevational view of the apparatus of the present invention;

FIG. 7 is a rear elevational view of an electrical terminal comprising a portion of the apparatus; and, FIG. 8 is a front elevational view of a terminal block comprising a of the apparatus.

Corresponding reference characters indicate corresponding parts throughout the several views of the drawings.

DESCRIPTION OF THE PREFERRED EMBODIMENT

Figure 3:
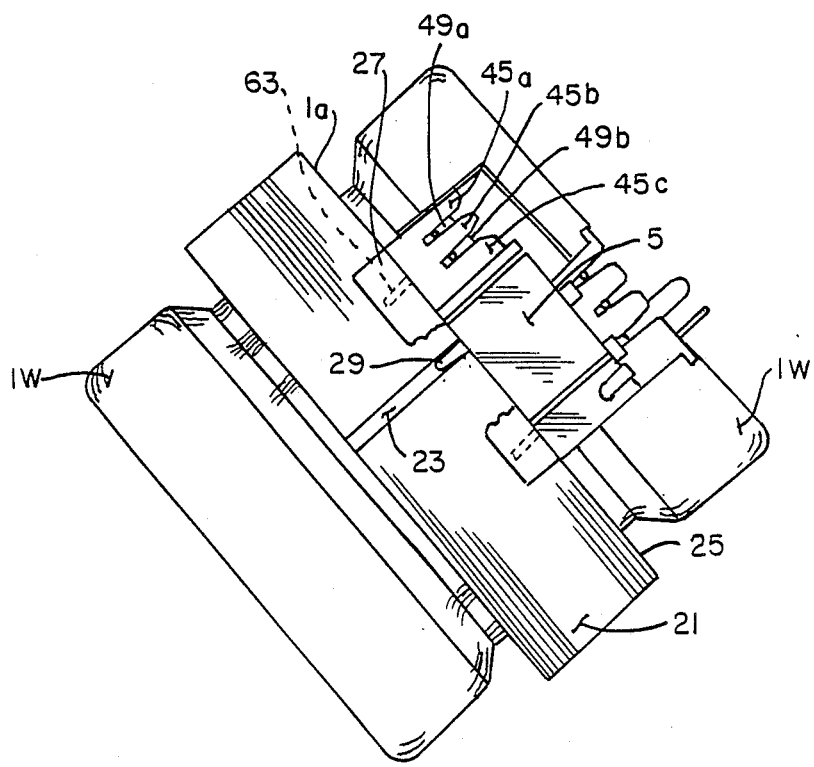
FIG. 3 is a side plan view of the motor stator assembly showing the installation of the apparatus.
Figure 2:
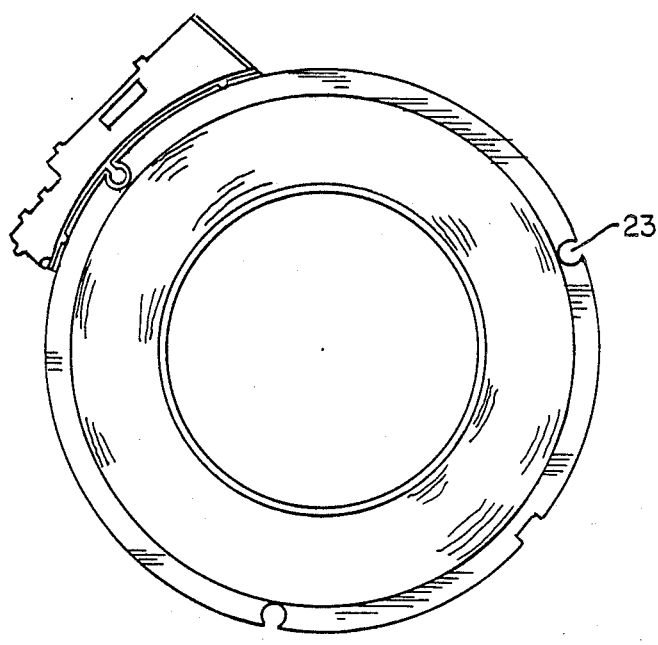
FIG. 2 is a sectional view taken along line 2—2 in FIG. 1.
Figure 6:
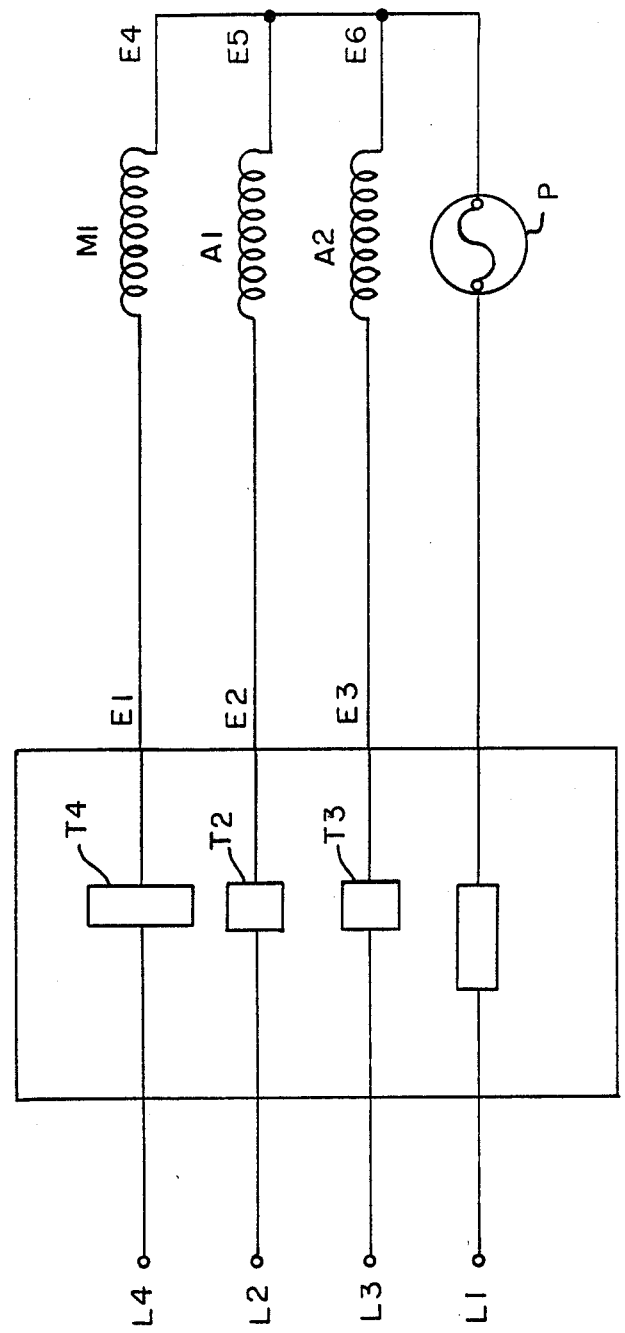
FIG. 6 is an electrical schematic of the circuit formed upon of the assembly of the apparatus of the present invention.

Referring now to the drawings, a dynamoelectric machine or motor M has a stator assembly S comprised of one or more sets of electrical windings. As shown in FIG. 6, stator assembly SA includes three sets of electrical windings designated M1, A1 and A2, respectively. Those skilled in the art will recognize that the winding M1 represents a main winding, while the windings A1 and A2, in turn, are formed from coil sets arranged in electrical and physical poles, the individual turns of which are distributed in winding receiving slots (not shown) in a stator core SC of stator assembly SA. Other motor types, for example, permanent split capacitor, three phase or brushless permanent magnet motors may be used as the motor M, if desired. The particular winding configuration shown in FIG. 6, as will be appreciated, is intended to represent any motor winding configuration. One end of each set of windings (ends E1, E2 and E3 of winding set M1, A1 and A2) is adapted for connection to external electrical leads L4, L2, and L3, respectively. The connection between the end of the winding sets and the external leads permits electrical current to be applied to the windings to run motor M. A plurality of electrical terminals (T4, T2, and T3, for example) are used for making the connection between the external leads and the ends of the winding sets.

A motor protector P is typically connected between the external leads (lead L1, for example) and the sets of windings. The motor protector P senses the operating temperature of and current flow to the stator windings and interrupts flow of current to the stator windings when the sensed condition, for example temperature, exceeds a predetermined level. As shown in FIG. 6, motor protector P, in effect, functions as a circuit breaker. The protector normally forms a closed circuit between lead L1 and ends E4, E5, and E6 of the winding sets M1, A1 and A2. However, when the protector senses an operating condition of the stator assembly as reaching or exceeding a predetermined level, the protector creates an open circuit between lead L1 and the winding sets. This interrupts flow of current to the stator winding and terminates operation of motor M until the sensed stator assembly temperature falls below the predetermined level. As will be appreciated by those skilled in the art, the protector P also may be current sensitive instead of or in addition to being temperature sensitive.

Because of the space limitations of an appliance, for example, a dishwasher, in which motor M is used, the motor assembly is subject to space limitations. As a consequence, it is preferable that the termination and electrical interconnection of the various components mentioned above be done in as compact a space as possible. Further, to facilitate the manufacturing operation, it is desirable that the assembly be an automated assembly which is accomplished without requiring soldering of electrical leads. Also, it is desirable that the completed motor assembly be readily tested for proper operation after manufacture.

An improvement of the present invention includes apparatus 1 for electrically interconnecting the external electrical leads, the thermal protector and the end of at least one set of windings. Apparatus 1 includes a first means 3 for commonly connecting one end of the winding sets (ends E4, E5, and E6) with thermal protector P. Means 3, which includes protector block 5, also houses the thermal protector P. Protector block 5 has a hollow main section 7 sized to receive a main body portion B of protector P. As shown in FIG. 4, the main body B of the thermal protector P is rectangular in shape and the protector has an electrically conductive arm A1 extending outwardly to one side of the main body B, and a second electrically conductive arm A2 which extends to the rear of the protector, referenced to FIG. 4. Main section 7 of block 5 has a hollow cavity 9 defined by a top wall or surface 11, bottom surface 13 a side wall 15, and a forward face 17. The rear of section 7 is open and the protector is inserted into cavity 9 through the opening in the protector block.

Protector block 5 sits upon a flat portion 19 of a stator core 21. Core 21 is circular in plan in the embodiment illustrated and has at least one slot 23 formed therein, which is open on a face 25 of the stator assembly. An arcuate shield 27 extends across the length of the front face of block 5. The shield 27, preferably constructed from the same material as the block 5, has a preselected thickness such that the shield 27 is somewhat flexible. A cylindric guide 29 depends beneath shield 27 and is received in slot 23 to locate the protector block with respect to the stator assembly. Two housing ribs 63 contact the outer contour of the stator core. Preferably, the guide 29 has a smaller dimension than the slot 23 to provide ease of entry of the guide. The block 5 is held in position by the flexing of the arc shaped shield 27, which permits the block 5 to sandwich the core between the ribs 63 and the guide 21 in a tight, press fit like relationship. This is an important structural feature of our invention. In prior art devices of which we are aware, pins or series of pins are press fit into corresponding receptacles and maintain their positions in use by means of a designed interference fit. Control of the tolerances in this type of fit is difficult to maintain in production. In addition, many lamination designs cannot tolerate multiple holes in the lamination without adversely effecting electrical performance of the stator assembly. As will be appreciated by those skilled in the art, the slot 23 may comprise an indexing slot punched in the stator laminations during their manufacture. Even if it is a separate slot, however, its use should not adversely affect motor performance, as compared to multiple opening arrangements.

The sensing element of protector P is located so as to be in proximity to end turn portion 100 of the winding sets M1, A1, and A2. In order to enhance proper protector operation, the main portion of lower surface 13 of section 7 is removed leaving a rear strip 31 extending lengthwise of section 7 and side strips 33 and 35 which delimit a heat transfer area 100. The rear and side strips support main body B of the protector while nearly the entire sensing element is exposed to the stator assembly along the transfer area 100.

In addition to main section 7, protector block 5 also includes and auxiliary or side section 37. Section 37 is also hollow and is integrally formed with main section 7 of the protector block. As viewed in FIG. 4, section 37 is to the right of main section 7 and arm A1 of protector P is received in the hollow portion of this section. Section 37 has an upper face 39, a lower face 41 and a side wall 43. Face 17 of section 7 extends across the face of section 37. A plurality of fingers (fingers 45A, 45B, and 45C) are formed in upper face 39 of section 37 and a corresponding number of fingers (47A, 47B, and 47C) are also formed in the lower face of the section. The fingers 45 formed in the upper face of section 37 and the fingers 47 formed in the lower face are in registry with each other. The tips of the respective fingers define open mouth channels or slots between the respective fingers. The space formed between fingers 45A and 45B defines a slot 49A and the space between 45B and 45C defines a slot 49B, which extend through the section 37. During assembly of motor M, the ends E4, E5, and E6 of the winding sets M1, A1, and A2 are inserted in the predetermined ones of the slots defined by the respective fingers. The ends of the respective winding sets are installed then terminated by an IDC type terminal such as an AMP mag-mate terminal 6 prior to installation of thermal protector P. When the thermal protector is inserted in main section 7 of block 5, arm A1 forms an electrical contact with the ends of the winding sets installed in auxiliary section 37 through and in cooperation with the IDC terminal. Consequently, arm A1 of protector P, for purposes of this specification, may be thought of as a bus bar.

Apparatus 1 further includes a second means 53 interlocking with means 3 to hold thermal protector P in place. Means 53 includes a terminal block 55, a body 57 of which effects connection of protector P to external lead L1 and for connecting ends E1, E2, and E3 of winding sets M1, A1, and A3, respectively to external least L4, L2 and L3. These latter electrical connections are effected using IDC terminals T1, T2, and T3. Means 57 includes means 59 for capturing terminals T1, T2 and T3 and locking them in position. This facilitates automated stator connection and testing of the stator assembly after completion of motor construction.

As shown in FIG. 5, the top and bottom faces 11 and 13, respectively of main section 7 of protector block 5 are greater than the length of main body B of protector P. Thus, there is a space at the rear of main section 5 after protector P is installed. A locking tab 61 projects downwardly from forward face 110 of terminal block 55. Further, a series of longitudinally aligned tabs 65, 67, and 69 project downwardly from a surface 71 of the terminal block (FIG. 8). The spacing between tab 61 and tabs 65, 67, and 69 corresponds to the width of strip 31 on the bottom face of main section 7 of the protector block. The height of terminal block 55 corresponds to the spacing between upper and lower faces 11 and 13 of section 5 for the terminal block to be installable in cavity 9 of the protector block. Upon insertion of the terminal block thereinto, strip 31 is captured between locking tab 61 and the tabs 65, 67, and 69 so to interlock the blocks. This interlocking serves to hold protector P in place. Other interlocking components are compatible with the broader aspects of our invention.

A guide means 73 is provided to align the terminal block with the protector block. A slot 75 formed in upper face 11 of protector block section 5 extends forwardly from the rear of the top face. A guide finger 77, which is received in slot 75, projects upwardly a face 79 of the terminal block. The guide finger is formed at the forward end of the face 79.

As previously noted, thermal protector P has an electrical contact arm A2 which projects rearwardly through the open end of protector block section 7 when the thermal protector is installed in cavity 9. Terminal block 55 has first and second interior walls, 81 and 83, respectively, which extend lengthwise through the terminal block. Walls 81 and 83 are adjacent side wall 85 of the terminal block. The walls are parallel to each other and define a passage by which arm A2 extends through the terminal block so to project outwardly from the rear terminal block. This permits electrical lead L1 to be connected to arm A2.

As shown in FIG. 4, a plurality of inwardly extending cavities 89 are formed in a face 87 of the terminal block. Three such cavities are shown in FIG. 4. Cavities 89 are rectangular in cross section and are sized to accommodate the rectangularly shaped end 91 of terminals T1, T2, etc. Posts 59 are formed in the forward face of each cavity. In addition to the cavities 89, a plurality of slots 95A, 95B, and 95C are formed in the top face of the terminal block and extend into the upper wall 97 of each cavity. Similarly, a plurality of slots 99A, 99B, and 99C are formed in the bottom face referred to FIG. 4, of the terminal block and extend into the lower end 101 of each cavity 89. The respective slots 95 and 99 are in registry with each other and the respective slots correspond in size and length. The slots are formed to be midway along the width of each cavity and are designed for the respective ends of the winding sets to be inserted in the corresponding slots in the top and bottom faces of the terminal block. The winding set ends are inserted into the cavities prior to the insertion of the associated terminals T1-T3 into the cavity. Consequently, insertion of the terminals into the cavity after insertion of the respective ends of the winding sets forms an electrical connection between the terminal and the respective ends of the winding sets.

During assembly of motor M, protector block 5 is placed on the flat section 19 of core 21. Then, ends E4-E6 of the respective winding sets are inserted in their respective slots 45 and 47 in section 37 of the protector block and terminated. Next, thermal protector P is inserted in cavity 9 of section 5 of the protector block. Arm A1 of the thermal protector is inserted into section 37 of the protector block and forms an electrical connection with ends E4-E6 of winding sets M1, A1 and A2 in conjunction with IDC terminal 68.

Terminal block 55 is inserted into cavity 9 after insertion of thermal protector P. Guide finger 77 aligns the terminal block with the protector block and the tabs 61 and 65-69 interlock with strip 31 of the protector block to interlock the terminal block with the protector block. During this operation, arm A2 of the thermal protector is inserted through the passage defined by walls 81 and 83 of the terminal block so to extend past the face 87 of the terminal block. Ends E1-E3 of winding sets M1, A1 and A2, respectively, are then inserted in slots 99A-99C so to be positioned in respective cavities 89. Thereafter, terminals T1-T3 are inserted into the cavities. The insertion of the terminals forms an electrical connection between the terminals and the respective ends E1, E2 and E3 of the winding sets. Now A2 and terminals T1-T3 are connectable by means of a plug containing 4 female terminals held in proper relationship by the plug body identified generally by the reference numeral 115.

If desired, a test connector can be hooked up with the respective terminals of the terminal block, and with arm A2 and appropriate electrical tests on the stator can be made to check the stator component of the motor M prior to further processing. The stator assembly then is inserted into a shell or housing H having a rear wall end shield 116. The end shield 116 has an opening 117 formed in it, which exposes the terminals T1, T2, and T3 and arm A2 of the protector. The connecting plug 115 is sized for reception in the opening 117. The plug 115 is designed to interlock in position. As thus designed, an easy to use motor connection method and structure is provided. Numerous variations, within the scope of the appended claims, will be apparent to those skilled in the art in light of the foregoing description and accompanying drawings. While leads L1-L3 are illustrated as being enclosed in a connector block, which mates with block 57, they too may be individual leads, which mate with the block 57. Various different terminal configurations are compatible with our invention. Likewise, while a particular protector design has been shown, other designs may be employed. These variations are merely illustrative.

Having thus described the invention, what is claimed and desired to be secured by Letters Patent is:

1. In a dynamoelectric machine having a stator assembly comprised of one or more sets of electrical windings, each end of each set of windings being adapted for connection to external electrical leads by which an electric current is applied to the windings, a plurality of electrical terminals for making the connection between the external leads and the sets of windings, and protector means connected between at least one external lead and at least one set of windings for sensing an operating condition of the stator assembly and interrupting flow of current to the sets of windings when a sensed condition exceeds a predetermined level, the improvement comprising apparatus for electrically interconnecting the external electrical leads, protector means and ends of said at least one of windings, said apparatus including a first means for commonly connecting one end of said winding set with the protector means and for housing the protector means, and a second means interlocking with the first means to hold the protector means in place, said second means including means for effecting connection of the protector means to one of the external leads and for connecting the other end of said at least one winding set to another of the external leads.

2. The improvement of claim 1 wherein the electrical connection between the other end of said winding set and another electrical lead is effected using a terminal and said second means includes means for capturing the terminal and locking them in position.

3. The improvement of claim 1 wherein said first means comprises a protector block.

4. The improvement of claim 3 wherein the protector means has a rectangular shaped main body portion and an electrically conductive arm extending outwardly from one side of the body and the protector block includes a hollow main section open at its one end to form a cavity and sized to receive the main body portion of the protector.

5. The improvement of claim 4 wherein the protector block is positionable over a portion of the stator assembly and the main section of the block has a face with a portion thereof removed so to expose the protector means to said at least one winding set.

6. The improvement of claim 5 wherein the stator assembly is installed in a stator core assembly having a slot formed therein and the protector block has a guide sized to be received in the slot, said guide projecting outwardly from a face of the protector block to locate the block with respect to said core during assembly.

7. The improvement of claim 4 wherein the protector block has a hollow auxiliary section integrally formed with the main body section along one side thereof, one end of said auxiliary section being open enabling said arm of said protector to be received in said auxiliary section when the main body of the protector is installed in the main section of the block.

8. The improvement of claim 7 wherein the auxiliary section has a first face and a second face with a plurality of fingers being formed in each of said faces.

9. The improvement of claim 8 wherein the fingers formed in the upper and lower faces are in registry with each other, said fingers being spaced from one another, the space between adjacent fingers defining a slot into which the end of said at least one winding set is inserted during assembly of the machine, said one end being simultaneously inserted through corresponding upper and lower slots of said auxiliary section prior to insertion of said protector means into said main section, said arm of said protector means forming an electrical contact with said end of said at least one winding set installed in the auxiliary section upon installation of the protector means in the main section.

10. The improvement of claim 4 wherein said second means comprises a terminal block.

11. The improvement of claim 10 further including means for interlocking said terminal block to said protector block.

12. The improvement of claim 11 wherein a portion of a face of the protector block is removed and a strip of material extends across the rear portion of said face.

13. The improvement of claim 12 wherein said terminal block further includes a locking tab projecting downwardly from a first face of the terminal block, and a series of aligned tabs projecting downwardly from the bottom surface of the terminal block, the spacing between the locking tab and aligned tabs corresponding to the width of the strip whereby, upon insertion of the terminal block into the main section of the protector block, the strip is captured between the locking tab and aligned tabs to interlock the blocks.

14. The improvement of claim 11 further including guide means aligning the terminal block with the protector block.

15. The improvement of claim 14 wherein a slot is formed in a face of the protector block and extends forwardly from the rear of the top face partially along the top face, and the guide means includes a guide finger projecting upwardly from the face of the terminal block at a forward end thereof, said guide finger being received in said slot to align the terminal block and the protector block.

16. The improvement of claim 11 wherein the protector means has an electrical contact arm projecting through the open end of the main section of the protector means when the protector is installed in the protector block and the terminal block includes means for securing said protector arm so that said protector arm extends through the terminal block for connection with an external electrical lead.

17. The improvement of claim 16 further including means defining at least one slot in the top and bottom face of the terminal block, said slot formed in the top face being in registry with the slot formed in the bottom face, and the slots corresponding in size and length with each other.

18. The improvement of claim 17 wherein at least one slot is so that an end of said at least one winding set is inserted in said slot, said end being inserted prior to insertion of a terminal into the cavity with which the slot is associated, whereby insertion of the terminal in the cavity electrically connects the terminal to that end of the winding set.

19. In a dynamoelectric machine having a stator assembly including one or more sets of electrical windings, each end of each set of windings being adapted for connection to external electrical leads by which an electric current is applied to the windings, a plurality of electrical terminals for making the connection between the external leads and the sets of windings, and protector means connected between at least one external lead and at least one set of windings for sensing an operating condition of the stator assembly and interrupting flow of current to the sets of windings when a sensed condition exceeds a predetermined level, the improvement comprising apparatus for electrically interconnecting the external electrical leads, protector means and ends of said at least one of windings, said apparatus including a first means comprising a protector block for commonly connecting one end of said winding set with the protector means and for housing the protector means, the protector block having a rectangular shaped main body portion and an electrically conductive arm extending outwardly from one side of the body, said hollow main section being open at one end to form a cavity sized to receive the main body portion of the protector, the protector block further having a hollow auxiliary section integrally formed with the main body section along one side thereof, one end of said auxiliary section being open enabling said arm of said protector to be received in said auxiliary section when the main body of the protector is installed in the main section of the block, and a second means interlocking with the first means to hold the protector means in place, said second means including means for effecting connection of the protector means to one of the external leads and for connecting the other end of said at least one winding set to another of the external leads.

20. The improvement of claim 19 wherein the auxiliary section has a first face and a second face with a plurality of fingers being formed in each of said faces.

21. The improvement of claim 20 wherein the fingers formed in the upper and lower faces are in registry with each other, said fingers being spaced from one another, the space between adjacent fingers defining a slot into which the end of said at least one winding set is inserted during assembly of the machine, said one end being simultaneously inserted through corresponding upper and lower slots of said auxiliary section prior to insertion of said protector means into said main section, said arm of said protector means forming an electrical contact with said end of said at least one winding set installed in the auxiliary section upon installation of the protector means in the main section.

22. In a dynamoelectric machine having a stator assembly including one or more sets of electrical windings, each end of each set of windings being adapted for connection to external electrical leads by which an electric current is applied to the windings, a plurality of electrical terminals for making the connection between the external leads and the sets of windings, and protector means connected between at least one external lead and at least one set of windings for sensing an operating condition of the stator assembly and interrupting flow of current to the sets of windings when a sensed condition exceeds a predetermined level, the improvement comprising apparatus for electrically interconnecting the external electrical leads, protector means and ends of said at least one of windings, said apparatus including a first means comprising a protector block for commonly connecting one end of said winding set with the protector means and for housing the protector means, the protector block having a rectangular shaped main body portion and an electrically conductive arm extending outwardly from one side of the body and a hollow main section open at its one end to form a cavity and sized to receive the main body portion of the protector, a portion of a face of the protector block being removed and a strip of material extending across the rear portion of said face, a second means comprising a terminal block interlocking with the first means to hold the protector means in place, said second means including means for effecting connection of the protector means to one of the external leads and for connecting the other end of said at least one winding set to another of the external leads, and means for interlocking said terminal block to said protector block.

23. The improvement of claim 22 wherein said terminal block further includes a locking tab projecting downwardly from a first face of the terminal block, and a series of aligned tabs projecting downwardly from the bottom surface of the terminal block, the spacing between the locking tab and aligned tabs corresponding to the width of the strip whereby, upon insertion of the terminal block into the main section of the protector block, the strip is captured between the locking tab and aligned tabs to interlock the blocks.

24. In a dynamoelectric machine having a stator assembly including one or more sets of electrical windings, each end of each set of windings being adapted for connection to external electrical leads by which an electric current is applied to the windings, a plurality of electrical terminals for making the connection between the external leads and the sets of windings, and protector means connected between at least one external lead and at least one set of windings for sensing an operating condition of the stator assembly and interrupting flow of current to the sets of windings when a sensed condition exceeds a predetermined level, the improvement comprising apparatus for electrically interconnecting the external electrical leads, protector means and ends of said at least one of said windings, said apparatus including a first means comprising a protector block for commonly connecting one end of said winding set with the protector means and for housing the protector means, the protector block having a rectangular shaped main body portion and an electrically conductive arm extending outwardly from one side of the body, a hollow main section open at its one end to form a cavity and sized to receive the main body portion of the protector, a second means comprising a terminal block interlocking with the first means to hold the protector means in place, said second means including means for effecting connection of the connector means to one of the external lead and for connecting the other end of said at least one winding set to another of the external leads, means for interlocking said terminal block to said protector block, and guide means aligning the terminal block with the protector block, a slot being formed in a face of the protector block and extending forwardly from the rear of its top face partially along the top face, the guide means including a guide finger projecting upwardly from the face of the terminal block at a forward end thereof, said guide finger being received in said slot to align the terminal block and the protector block.

25. The improvement of claim 24 wherein the protector means has an electrical contact arm projecting through the open end of the main section of the protector means when the protector is installed in the protector block and the terminal block includes means for securing said protector arm so that said protector arm extends through the terminal block for connection with an external electrical lead.

26. The improvement of claim 25 wherein a plurality of inwardly extending cavities are formed in a face of the terminal block with a internally extending post being formed in the face of the cavity, one end of the terminals being received in the cavities with the inserted terminal end fitting over a post to capture the terminal in the cavity.

27. The improvement of claim 26 further including means defining at least one slot in the top and bottom face of the terminal block, said slot formed in the top face being in registry with the slot formed in the bottom face, and the slots corresponding in size and length with each other.

28. The improvement of claim 27 wherein at least one slot is so that an end of said at least one winding set is inserted in said slot, said end being inserted prior to insertion of a terminal into the cavity with which the slot is associated, whereby insertion of the terminal in the cavity electrically connects the terminal to that end of the winding set.

* * * * *